US011468172B2

(12) United States Patent
Rickerd et al.

(10) Patent No.: US 11,468,172 B2
(45) Date of Patent: Oct. 11, 2022

(54) BROWSER EXTENSION SECURITY SYSTEM

(71) Applicant: Cisco Technology, Inc., San Jose, CA (US)

(72) Inventors: Jacob Rickerd, Superior Township, MI (US); Steve Edwards, Brighton, MI (US); Zack Hardie, Ypsilanti, MI (US); Peter Jackson, Ann Arbor, MI (US); Kyle Lady, Ann Arbor, MI (US); Benjamin Peters, Pinckney, MI (US); Art Sturdevant, Brighton, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 364 days.

(21) Appl. No.: 16/529,987

(22) Filed: Aug. 2, 2019

(65) Prior Publication Data

US 2020/0250316 A1 Aug. 6, 2020

Related U.S. Application Data

(60) Provisional application No. 62/801,876, filed on Feb. 6, 2019.

(51) Int. Cl.
*G06F 21/57* (2013.01)
*G06Q 10/06* (2012.01)
*G06F 8/61* (2018.01)

(52) U.S. Cl.
CPC ....... *G06F 21/577* (2013.01); *G06Q 10/0635* (2013.01); *G06F 8/61* (2013.01); *G06F 2221/033* (2013.01); *G06F 2221/2141* (2013.01)

(58) Field of Classification Search
CPC ........... G06F 21/577; G06F 2221/2141; G06F 2221/033; G06F 8/61; G06F 9/44526; G06Q 10/0635
See application file for complete search history.

(56) References Cited

U.S. PATENT DOCUMENTS 8,181,254 B1 * 5/2012 Kay .................. G06F 21/121
713/168
8,365,291 B1 * 1/2013 Le .................... G06F 21/6263
726/25

(Continued)

OTHER PUBLICATIONS

Rickerd, Jacob et al., "Democratizing Chrome Extension Security", duo.com, Feb. 21, 2019, pp. 1-16, downloaded from Internet Aug. 2, 2019; https://duo.com/blog/crxcavator.

(Continued)

*Primary Examiner* — Mohammad W Reza
(74) *Attorney, Agent, or Firm* — Edell, Shapiro & Finnan, LLC

(57) ABSTRACT

Presented herein are techniques for automatically generating information about risks associated with browser extensions used by browsers in an enterprise network for purposes of determining whether to whitelist a browser extension in response to a request from a user. A request to install a browser extension is obtained from a user device of a plurality of user devices associated with an organization, wherein the request comprises an extension identifier for the browser extension. A risk score is generated for the browser extension based on risk values for each of one or more permissions requested by the browser extension. The risk score is compared to a threshold value to determine whether the browser extension satisfies risk standards of the organization, and if so, the browser extension is automatically added to a whitelist of permitted extensions for future installation on the plurality of user devices.

20 Claims, 11 Drawing Sheets

(56) References Cited

U.S. PATENT DOCUMENTS

| | | | |
|---|---|---|---|
| 9,635,041 B1 | 4/2017 | Warman et al. | |
| 9,870,116 B1 | 1/2018 | Yasskin | |
| 10,212,130 B1* | 2/2019 | Yang | H04L 63/0236 |
| 2013/0247030 A1* | 9/2013 | Kay | H04L 63/1441 |
| | | | 717/178 |
| 2015/0007330 A1* | 1/2015 | Gomez | G06F 21/577 |
| | | | 726/25 |
| 2018/0239826 A1* | 8/2018 | Epstein | G06F 16/958 |
| 2018/0343174 A1 | 11/2018 | Battre et al. | |
| 2019/0251252 A1* | 8/2019 | Prakash | H04L 63/1416 |
| 2020/0195626 A1* | 6/2020 | Mossoba | G06F 9/547 |

OTHER PUBLICATIONS

Sjösten, Alexander et al., "Discovering Browser Extensions via Web Accessible Resources", cse.chalmers.se, Mar. 22, 2017, pp. 1-8.
Iceberg, "Extension List Dumper 2", Add-ons for Firefox, 2 pages, downloaded from Internet Aug. 1, 2019; https://addons.thunderbird.net/en-us/firefox/addon/extension-list-dumper-2/?src=cb-dl-created.
Unknown, "1400900—[Shield] Opt-out Study: TAAR Experiment", 8 pages, downloaded from Internet Aug. 1, 2019; https://bugzilla.mozilla.org/show_bug.cgi?id=1400900.
Placitelli, Alessio et al., "Add-on recommendations for Firefox users: a prototype recommender system leveraging existing data sources", Firefox Data, Dec. 9, 2017, downloaded from Internet Aug. 2, 2019; https://blog.mozilla.org/data/2017/12/09/add-on-recommendations-for-firefox-users-a-prototype-recommender-system-leveraging-existing-data-sources/.

* cited by examiner

Extension Requests

Search... 🔍

| Icon | Name | Extension ID | Username | Business Justification | Status | Timestamp |
|---|---|---|---|---|---|---|
| ✉ | Extension 1 | dafalpmmoljlecaoelijmbkhpdoobmm | User 1 | View Justification | Requested ▶ | 2019-01-31T16:51:07.226767 |
| ◇ | Extension 2 | cneaciknhhaahdediboeafhdlbdoodg | User 2 | View Justification | Requested ▶ | 2019-01-29T18:10:19.671531 |
| ◷ | Extension 3 | hjngolefdpdnooamgdidlkjgmdcmcjnc | User 1 | View Justification | Requested ▶ | 2019-01-25T15:17:54.217634 |
| ? | Extension 4 | kmklifknlepgmbbigahhphncmgkppbjb | User 3 | View Justification | Requested ▶ | 2019-01-24T18:56:00.068357 |
| 🛒 | Extension 5 | hjngolefdpdnooamgdidlkjgmdcmcjnc | User 4 | View Justification | Requested ▶ | 2019-01-24T18:50:49.191036 |
| ⚠ | Extension 6 | dagcmkpagjlhakfdhnbomgmjdpkdklff | User 5 | View Justification | Requested ▶ | 2019-01-23T11:00:11.397582 |
| ⧖ | Extension 7 | hchlgfaicmddilenlflajnmomalehbom | User 2 | View Justification | Requested ▶ | 2019-01-16t22:53:57.124335 |
| $ | Extension 8 | obpdeolnggmbekmklghapmfpnfhpcndf | User 2 | View Justification | Requested ▶ | 2019-12-21T18:15:04.489362 |
| ▲ | Extension 9 | gncmnedemogangodljmfmlbndnchinm | User 2 | View Justification | Requested ▶ | 2018-12-18T01:59:38.162208 |

FIG.3

Extension User Statistics

Search... 🔍 — 512

| Icon | Name | Extension ID | Version | Users |
|---|---|---|---|---|
| ✉ | Extension 1 | aaebjepcfidgkojjbgoilgkgktehldj | 5.2 | 2 users |
| ◇ | Extension 2 | aamgapdgopfdmokckpkfciiddpahbbcg | 0.1.0.5 | 10 users |
| ◐ | Extension 3 | aapbdbdomjkkjkaonfhkkikfgjllcleb | 2.0.7 | 4 users |
| ? | Extension 4 | aapicclcgogkmnckokdopfmhonfmgoek | 0.10 | 772 users |
| 🛒 | Extension 5 | acodbpaepgiinlcjfnaebgndffpophkl | 2018.8.24.33255 | 1 users |
| ⚠ | Extension 6 | aeaggaibnhgfaehhlckeegpnigkjegac | 2018.12.21.55808 | 1 users |
| ⧖ | Extension 7 | aeblfdkhhhdcdjpifihhbdiopifjncoa | 1.13.2 | 7 users |
| $ | Extension 8 | aejklfdcbbaannjhejgkkidcemnllgepd | 2018.11.15.47282 | 1 users |
| ▲ | Extension 9 | agfdekbncfakhgofmaacjfkpbhjhpjmp | 2.0.0 | 21 users |
| ✆ | Extension 10 | aghbiahpbpaijjgnceidepookljebhfak | 2017.11.15.39989 | 1 users |

User ID _____ Delete

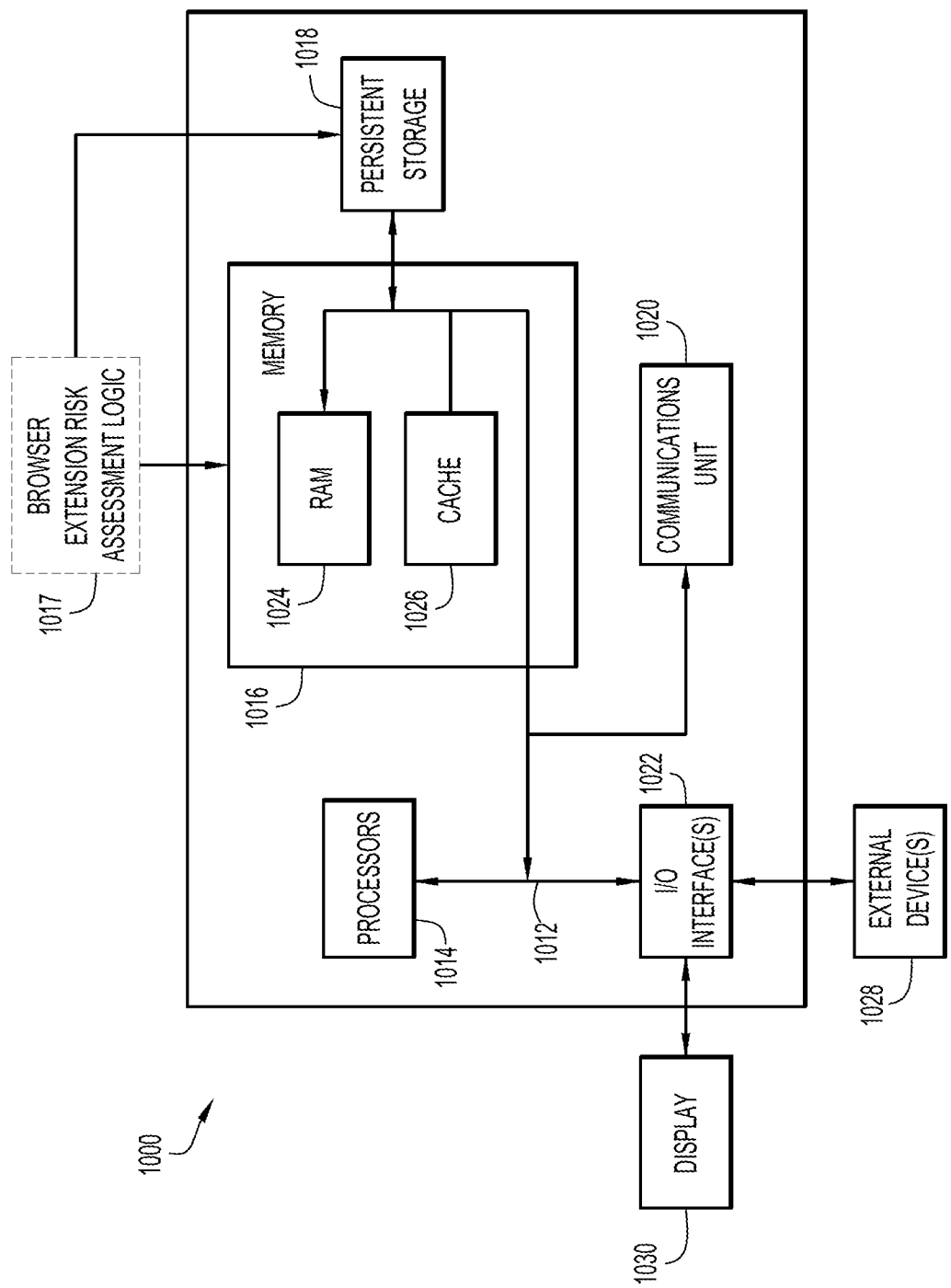

BROWSER EXTENSION SECURITY SYSTEM

PRIORITY CLAIM

This application claims priority to U.S. Provisional Application No. 62/801,876, filed Feb. 6, 2019, and entitled BROWSER EXTENSION SECURITY SYSTEM, the entirety of which is incorporated herein by reference.

TECHNICAL FIELD

The present disclosure relates to network security, and more particularly to security of web browsers.

BACKGROUND

In enterprise networks, network administrators are charged with the task of ensuring the security of user's web browsers. In larger enterprises, this can be cumbersome because numerous users may desire to install a wide range of web browser extensions for various functions that those users may need to perform. However, enabling end-users permission to install web browser extensions without oversight can potentially expose a network to security risks. While network administrators may review user requests to install extensions, the review process may be time-consuming.

BRIEF DESCRIPTION OF THE DRAWINGS

FIG. 3 illustrates a user interface in which data associated with extension explicit allow requests may be presented, according to an example embodiment.

FIG. 5 illustrates a user interface in which data associated with extensions obtained from a browser of a user device may be presented to a network administrator, according to an example embodiment.

FIG. 10 is a hardware block diagram of a computing device that may perform functions of a server in connection with the techniques depicted in FIGS. 1-9, according to an example embodiment.

DESCRIPTION OF EXAMPLE EMBODIMENTS

Overview

Figure 1:
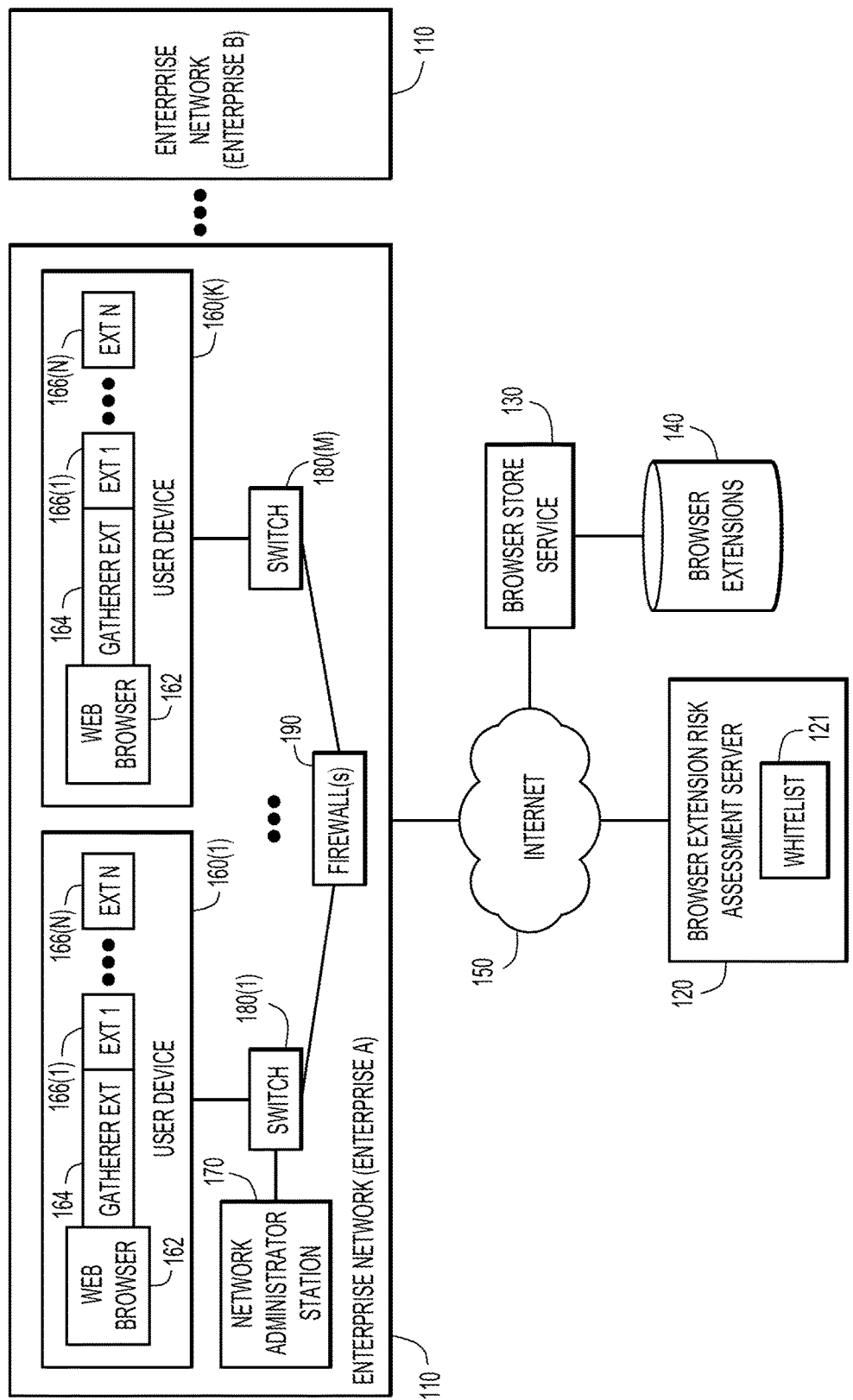
FIG. 1 is a high-level block diagram of a system in which browser extension risk assessment is made of extensions used by web browsers on user devices in an enterprise network, according to an example embodiment.

In one embodiment, a computer-implemented method automatically generates information about risks associated with browser extensions used by web browsers in an enterprise network for purposes of determining whether to whitelist a browser extension in response to a request from a user. A request to install a browser extension is obtained from a user device of a plurality of user devices associated with an organization, wherein the request comprises an extension identifier and a business justification for the browser extension. A risk score is generated for the browser extension based on risk values for each of one or more permissions requested by the browser extension. The risk score is compared to a threshold value for the organization to determine whether the browser extension satisfies risk standards of the organization, and if so, the browser extension is automatically whitelisted for future installation on the plurality of user devices.

Example Embodiments

The present disclosure relates to automatically generating information about risks associated with browser extensions used by browsers in an enterprise network for purposes of determining whether to whitelist a browser extension in response to a request from a user. Conventional approaches to whitelisting may leave end users with no clear path to request access to extensions not already explicitly allowed, and may require manual review from a network administrator before each extension can added to the list of allowed extensions in the enterprise network. This makes the process for allowing a new application slow and expensive.

In contrast, presented embodiments automate the process of reviewing browser extensions to determine whether an extension may be included in an organization's whitelist of approved extensions. These techniques employ a special-purpose browser extension that is configured to gather information about browser extensions installed in a browser, a specialized process to generate a risk score associated with browser extensions, and a process to continuously scan a browser store to determine when updates are released to browser extensions.

In particular, the special-purpose browser extension, referred to as a gatherer extension, detects when a user has navigated to a browser extension store, such as the Chrome™ Web Store, and obtains a browser extension identifier. The gatherer extension then compares the extension identifier to a whitelist of the organization to determine whether the corresponding browser extension has been approved for installation, and if so, the user may install the browser extension on the user's device. However, if the extension identifier is not included on the organization's whitelist, the gatherer extension may prompt the user to see if the user would like to submit the extension for approval to be whitelisted.

When a request is made to whitelist an extension, present embodiments validate the extension by evaluating a risk assessment report for the extension against the risk standards of the organization. The risk assessment report may include a risk score that is generated for the extension based on risk values for permissions requested by the extension. If the extension is found to meet the organization's risk standards, then the extension may be added to the organization's whitelist so that the extension may be installed onto devices of the organization, including the device of the user who requested review of the extension. Present embodiments thus provide the ability to automatically whitelist web extensions for an organization, thereby providing security to a network without requiring manual intervention by an administrator, which can be time-consuming and costly.

Moreover, present embodiments provide feedback to network administrators regarding the requested extensions, enabling administrators to obtain a better understanding of the risks imposed by extensions in the event that manual whitelisting decisions are necessary.

Referring first to FIG. 1, a block diagram is shown of a system 100 that includes an enterprise network 110, a browser extension risk assessment server 120, and a browser store service (server) 130 that distributes a plurality of browser extensions maintained in browser extension database 140.

The enterprise network 110 is in communication with the Internet 150 to which the browser extension risk assessment server 120 and browser store server 130 have connectivity. The enterprise network 110 includes a plurality of user devices 160(1)-160(K), a network administrator station 170, a plurality of network devices (such as switches) 180(1)-180(M) and one or more firewalls 190.

Each user device 160(i) includes a web browser 162 with a gatherer extension 164 and optionally, one or more installed extensions 166(1)-166(N). Each user device 160(i) may have a different selection of and number of extensions installed.

The browser extension risk assessment server 120 runs in the cloud, for example, as a Software-as-a-Service (SaaS) function to assess the risks associated with one or more browser extensions 166(1)-166(N) in use on a user device in the enterprise network 110. The browser extension risk assessment server 120 may include a whitelist 121 that stores a list of approved extensions. It should be understood that the browser extension risk assessment server 120 could reside within the enterprise network 110.

As explained in more detail hereinafter, the gatherer extension 164 works in concert with the browser extension risk assessment server 120 to enable automated risk assessment and other operations. The gatherer extension 164 operates to report to the browser extension risk assessment server 120 information about browser extensions installed on the browser 162 of an associated user device 160(i).

The browser extension risk assessment server 120 may perform browser risk assessment services for numerous enterprise networks (e.g., Enterprise A, Enterprise B, and so on), each with its own set of security policies that are configured on the browser extension risk assessment server 120.

Figure 2:
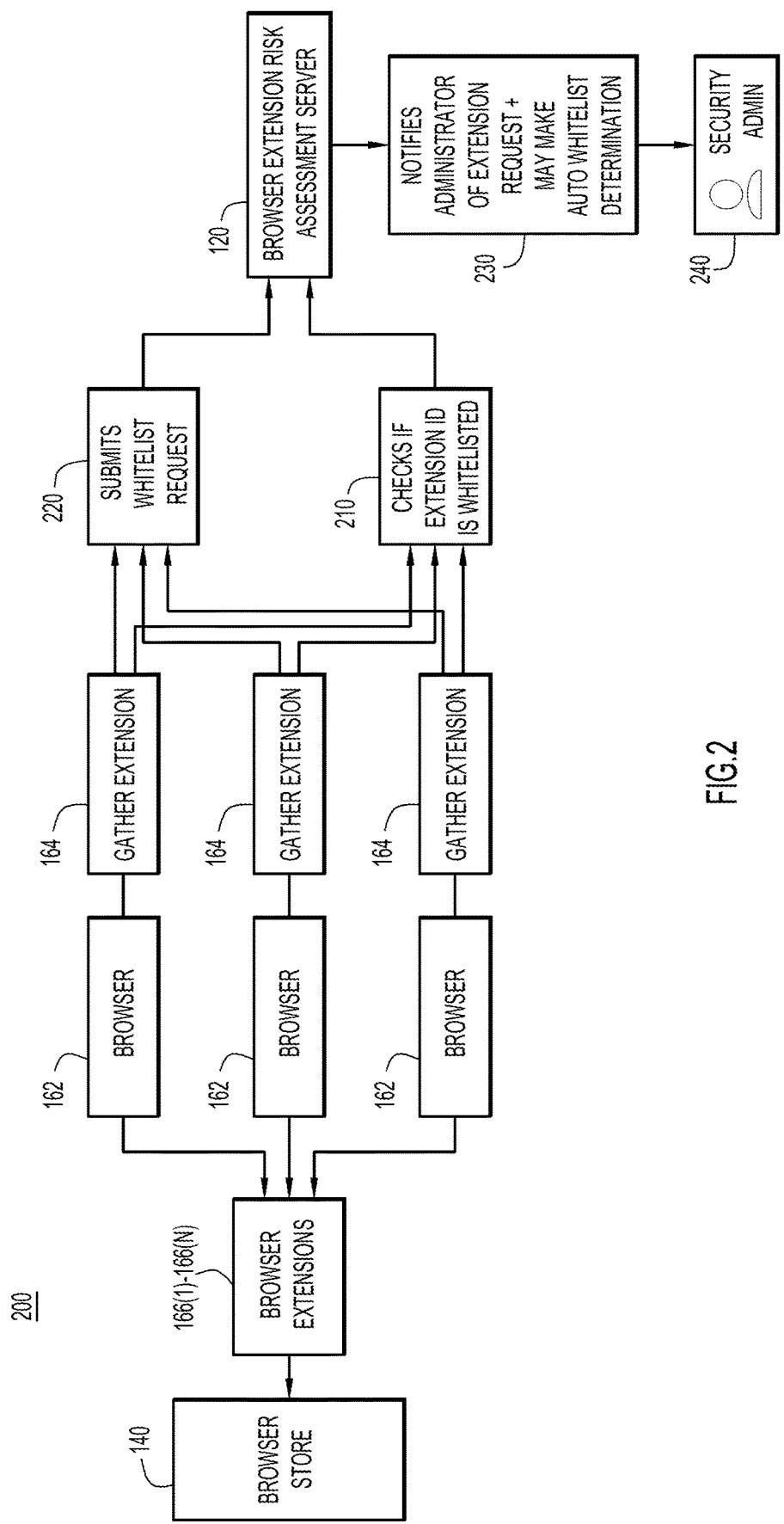
FIG. 2 is a diagram depicting an automatic browser extension explicit allow request process, according to an example embodiment.

Reference now made to FIG. 2 that illustrates an operational flow for an automatic browser extension explicit allow request process 200. The process 200 involves force-installing the gatherer browser extension 164 to any users in the organization who would like this feature enabled. This gatherer extension 164 watches for when a user navigates to a Uniform Resource Locator (URL) that looks like it is pointing to browser store 140. For example, in the case where the browser is a Chrome™ browser, then the URL may look like: http://chrome.google.com/webstore/detail/grammarly-for-chrome/kbfnbcaeplbcioakkpcpgfkobkghi-hen. Due to the fact that Chrome™ browser extensions are not able to use permissions or run content scripts on the Chrome™ Web Store, the gatherer extension 164 monitors the URL to detect when the user may be attempting to add an extension. The gatherer extension 164 may monitor URLs in an address bar, in a browser history or other log, or in any other location in which URLs may be found. The techniques presented herein are applicable to other types of web browsers, and Chrome™ is only one example.

When the gatherer extension 164 detects that the user is about to install a browser extension (shown at 166(1)-166(N) in FIG. 2), the gatherer extension 164 obtains the extension identifier (ID) from the URL and at 210 submits it to an Application Programming Interface (API) to the browser extension risk assessment server 120 that checks if the extension is whitelisted for the organization's user base. If the extension is not whitelisted, the gatherer extension 162 will display a message to the user asking if they would like to request the extension be whitelisted in their domain. If the user clicks yes, they are taken to a form that shows information about the requested extension and a text box asking for the business justification for the extension to be whitelisted. Once they hit submit, at 220, this extension request is submitted to browser extension risk assessment server 120. When the request is submitted to browser extension risk assessment server 120, a webhook is sent to a configured location. A webhook (also called a web callback or Hypertext Transfer Protocol (HTTP) push API) is a way for an application to provide other applications with real-time information. A webhook delivers data to other applications as it happens. This webhook contains details about the recent extension request. These details can include the extension ID, the business justification provided by the user, the identity of the user that is requesting the extension, and the status of the request. This webhook will trigger a function (such as an Amazon Web Services™ (AWS) Lambda serverless function) that will validate that the request came from the browser extension risk assessment server 120, pull the latest risk assessment report from browser extension risk assessment server 120, evaluate the risk report against the organization's risk standards (no blacklisted permissions, defined Content Security Policy, etc.), and at 230 notify a network/security administrator 240 that the extension is ready to be whitelisted and/or may automatically whitelist the extension. A whitelisted extension may be added to whitelist 121. If the extension report is found to be too risky to allow an automatic whitelist, the Lambda function will notify an administrator of this and flag it for manual review.

Administrators can also view a list of the requested extensions in the browser extension risk assessment server 120. Administrators are able to search by extension ID, the user that requested the extension, the business justification, and more. From this table, administrators can also view a link to the browser extension risk assessment server scan report where they can gain a better understanding of the risk imposed by the extension before making their whitelisting decision.

In one variation to the process 200, an automatic and closed-loop process may be provided whereby, depending on a risk factor/score associated with the extension requested to be whitelisted, the browser extension risk assessment server 120 may return a message to the gatherer extension 164 that automatically permits (whitelists) the extension to be installed on a user's browser 162, bypassing any security administrator review.

Reference is made to FIG. 3. FIG. 3 illustrates an example user interface 300, presented to a network/security administrator, which lists various extensions that have been requested for whitelisting in an enterprise. For each extension, there is an icon field 302 to show an icon representative of the extension, a name field 304 that includes the name of the extension, an extension ID field 306 that includes the extension ID, a user name field 308 that includes the name of the user who has requested that extension to be whitelisted, a business justification field 310 that contains a text explaining the business justification submitted by the user for that extension request, a status field 312, and a timestamp field 314 indicating when the request was received by the browser extension risk assessment server 120. The status field 312 has a drop-down menu for each entry that allows the administrator shows a status of Requested (pending review), Permit, and Deny the request. There may be other types of status tracked in the status field 312.

In summary, FIGS. 2 and 3 illustrate a process in which a detection is made for when a browser extension is installed on end users' browsers and in order to determine when a user is trying to install an extension that is not whitelisted. The browser extension risk assessment server 120 asks the user if they would like to whitelist an extension, and if so, prompts the user to provide a business justification for the request. The requested extension goes through an automatic security assessment and may be whitelisted based on the results of the assessment.

Collecting browser extension usage statistics is useful for organizations or enterprises for purposes ranging from general network security to incident response. Current options for gathering this data do not work on all platforms that support browser extensions, such as ChromeOS. In order to solve the problem of collecting browser extension usage statistics across all types of endpoints (e.g., user devices) in a fleet of user devices, the aforementioned gatherer browser extension 164 can collect this data. Whereas conventional solutions involve software that runs as an application directly on the operating system present embodiments include a browser extension to collect a list of browser extensions, thereby providing a platform-independent solution.

Figure 4:
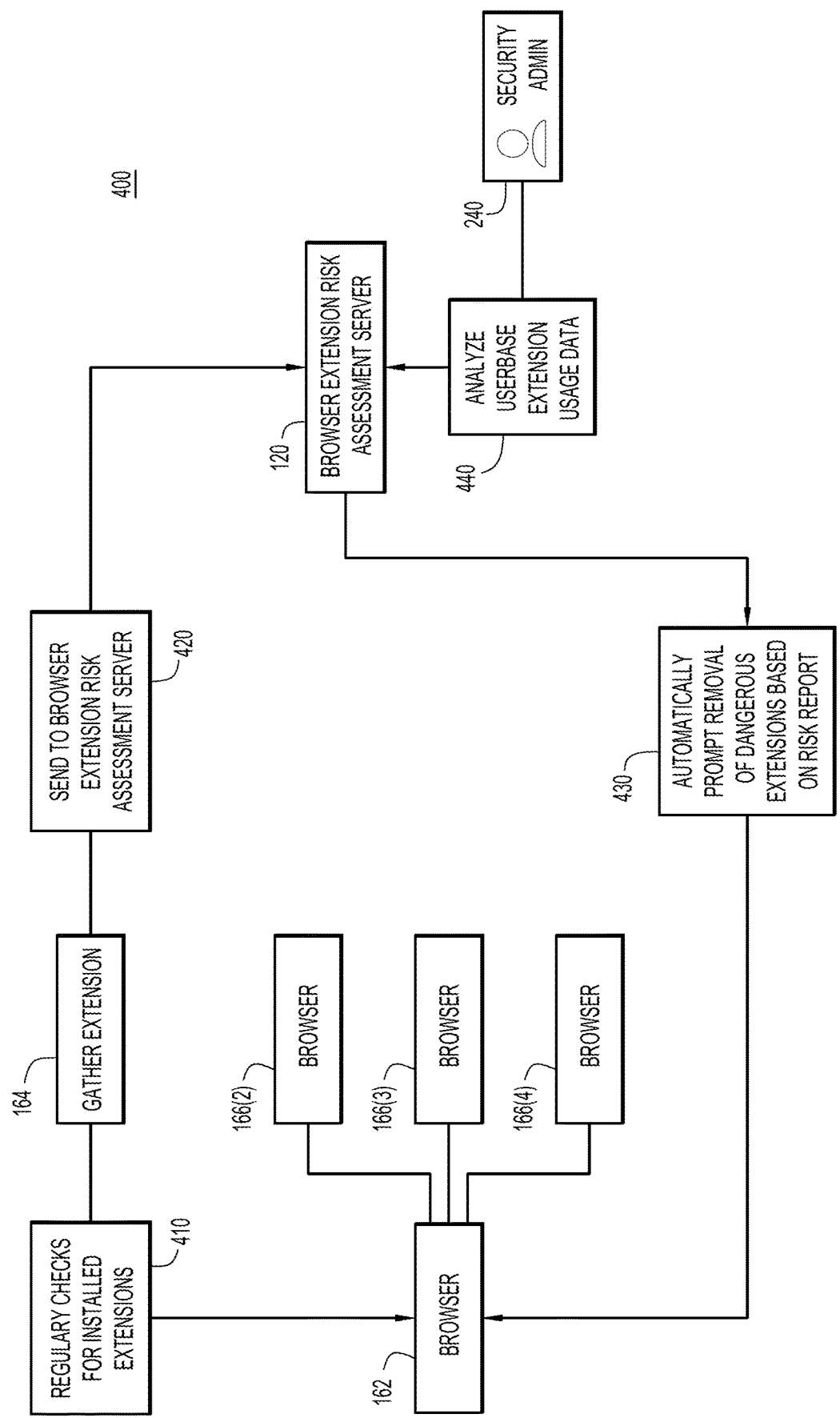
FIG. 4 is a diagram illustrating operations associated with a browser extension dedicated to gathering information about browser extensions installed in a browser, according to an example embodiment.

Reference is now made to FIG. 4, which illustrates an extension gathering process 400, according to an example embodiment. As mentioned above, a gatherer extension 164 is provided. The gatherer extension 164 is force-installed throughout a fleet user devices with a managed policy. This policy contains a group secret that authenticates the gatherer extension 164 to a particular group in the browser extension risk assessment server 120. When the gatherer extension is first installed on a browser 162, it will use the browser's API to obtain both a list of extensions, e.g., extensions 166(2)-166(4) that are installed, as well as the email address (or other identifier) of the user that is signed into or otherwise associated with the browser. This allows the browser extension risk assessment server 120 to attribute the list of extensions to a particular user. In addition to the extension ID, the browser extension risk assessment server collects, via the gatherer extension 164, the name, version, and an indication of whether the extension is allowed in incognito mode. Once the gatherer extension 164 has these pieces of information, at it will send it to the browser extension risk assessment server 120 where the data is aggregated for searching and viewing.

At 410, on a regular/periodic basis (e.g., every hour), the gatherer extension 164 will check to see if the list of installed extensions has changed. If so, at 420, the gatherer extension 164 will send the updated list to browser extension risk assessment server 120. If not, it does nothing. In the event the data in the browser extension risk assessment server 120 is deleted or otherwise inaccessible, the gatherer extension 164 will still send the browser extension usage data to the browser extension risk assessment server 120 once every several (e.g., seven) days.

Once the data is in the browser extension risk assessment server 120, at 430, a security administrator 240 can log in and view the aggregated data. FIG. 5 illustrates an example user interface 500 that displays extension user statistics. The user interface 500 includes an icon field 510 for the extension icon, a name field 512, an extension ID field 514, an extension version field 516, and a user field 518 that indicates how many users in an enterprise have installed a particular extension.

Specific users can be looked up to view what extensions and versions they have installed. Additionally, extensions link to risk assessment reports so that analysts can easily see how much risk a particular user is assuming. Extensions can also be sorted by the number of users that have a particular extension installed. This allows administrators to quickly sort extensions based on popularity within an organization.

Turning back to FIG. 4, since the browser extension risk assessment server 120 has been provided with information regarding the extensions that users have installed in addition to the risk reports for the extensions, at 440, the browser extension risk assessment server 120 may automatically prompt end users to remove the extensions from their browser according to a policy of an enterprise.

In summary, as depicted in FIGS. 4 and 5, a gathering browser extension is provided that allows administrators to gain insight into the browser extensions that are used within their fleet of devices. This data can be used to regulate whitelists, consolidate similar extensions, and allow for streamlined incident response.

Browser extensions can introduce substantial risk to an organization, but it can be difficult for network administrators or security analysts to objectively determine the risk that a given extension may impose to the organization, especially if the analysts are not Javascript experts.

Browser extensions generally include the same elements: a manifest that defines capabilities and functions of the extension, and Hypertext Markup Language (HTML)/JavaScript/ Cascading Style Sheet (CSS) files. The browser extension risk assessment server 120 has the ability to automatically assess an extension based on a predetermined set of risky behaviors.

Figure 6:
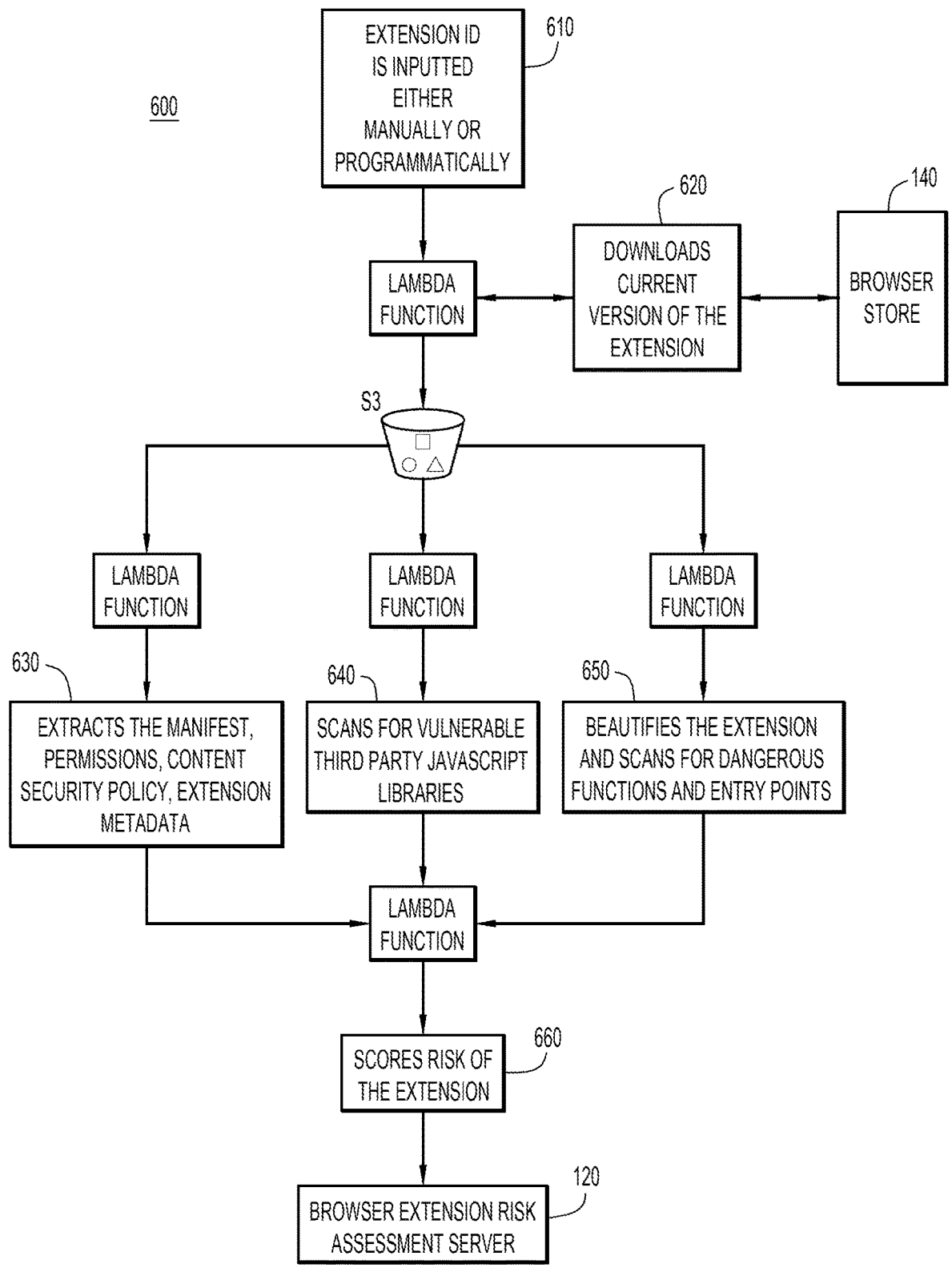
FIG. 6 is a flow diagram for a process for generating a risk score associated with browser extensions, according to an example embodiment.

Reference is now made to FIG. 6. FIG. 6 depicts a process 600 for generating an objective risk score associated with browser extensions. The risk score output of the process depicted in FIG. 6 may be used in connection with any of the embodiments presented herein that involve evaluation of a risk score, such as those depicted in FIGS. 2 and 4.

At 610, the browser extension risk assessment server 120 obtains (either manually or programmatically) an extension ID. A user can enter an extension ID manually, or the extension ID may be obtained by some automatic method, such as scripted API calls, or while scanning the web store. At 620, the browser extension risk assessment server 120 downloads the specified extension package from the browser store 140. The browser extension risk assessment server 120 then begins processing of the files in the extension package. At 630, the analysis starts by reading particularly risky sections of the manifest. The permissions and optional permissions sections of the manifest defines what the extension is allowed to access. Each permission may have a particular risk value that is associated with the permission. The browser extension risk assessment server 120 will process the list of permissions and adjust the extension's risk score accordingly based on the severity of the permission and the number of permissions defined in the manifest.

One example of a scale is as follows:
 none: 0
 low: 5
 medium: 10
 high: 15
 critical: 45

Next, the browser extension risk assessment server 120 will ingest the extension's Content Security Policy from the manifest. For every entry in the connect-src, default-src, script-src, and object-src section of the Content Security Policy, one point of risk is added. If that entry contains an asterisk, five points of risk are added. If a connect-src, default-src, script-src object-src, or child-src policy is missing, twenty-five points of risk are added for each missing section.

The browser extension risk assessment server 120 will also pull the extension metadata from the browser extension's store. If an address for the developer is missing from the store, one point of risk is added. If an email for the developer is missing from the store, one point of risk is added. If a privacy policy for the extension is missing from the store, one point of risk is added. If less than 1,000 users have rated an extension at the time of scan, one point of risk is added. If a support site for the extension is missing from the store, one point of risk is added. If the extension has less than 100,000 users at the time of scan, one point of risk is added. If a website for the extension is missing from the store, one point of risk is added. It should be appreciated that these values provide only an example of one embodiment and do not imply any limitations with regard to the scoring of an extension or the aspects of an extension that are subject to evaluation.

As another example, the following points of risk may be added based on how long ago the browser extension was last updated at the time of scan:

Last updated one month or less from the current date: 0 points

Last updated between one and three months from the current date: 1 point

Last updated between three and six months from the current date: 2 points

Last updated between six and nine months of the current date: 3 points

Last updated between six and nine months of the current date: 4 points

Last updated between six and nine months of the current date: 5 points

The following points of risk may be added based on a rating, on a scale of zero to five stars, for the extension at the time of scan:

Greater than four stars: 0 points
Between three and four stars: 1 point
Between two and three stars: 2 points
Between one and two stars: 3 points
Less than one star: 4 points At 640, the next component of the browser extension assessed is the JavaScript. For every external JavaScript file found in HTML documents, 3 points of risk are added. This is due to the fact that changing the JavaScript on the external source can change the functionality of the extension without actually submitting an update to the store.

In addition to external JavaScript files, the browser extension risk assessment server 120 can also parse the JavaScript files of an extension to determine what external calls the extension is making. For every external call (for example: xhr, fetch, etc.) made in a JavaScript file, 1 point of risk is added.

Finally, the browser extension risk assessment server 120 runs a third party JavaScript library vulnerability scanner against the libraries used in the extension to discover if any have known vulnerabilities. Any vulnerabilities found will add points of risk based on their severity, such as:

none: 0 points
low: 10 points
medium: 20 points
high: 30 points
critical: 40 points At 650, the browser extension risk assessment server 120 takes all of these findings and presents them to the user in an easy to use web interface that allows them to explore the results, and at 660, the extension risk score is presented.

Figure 7A:
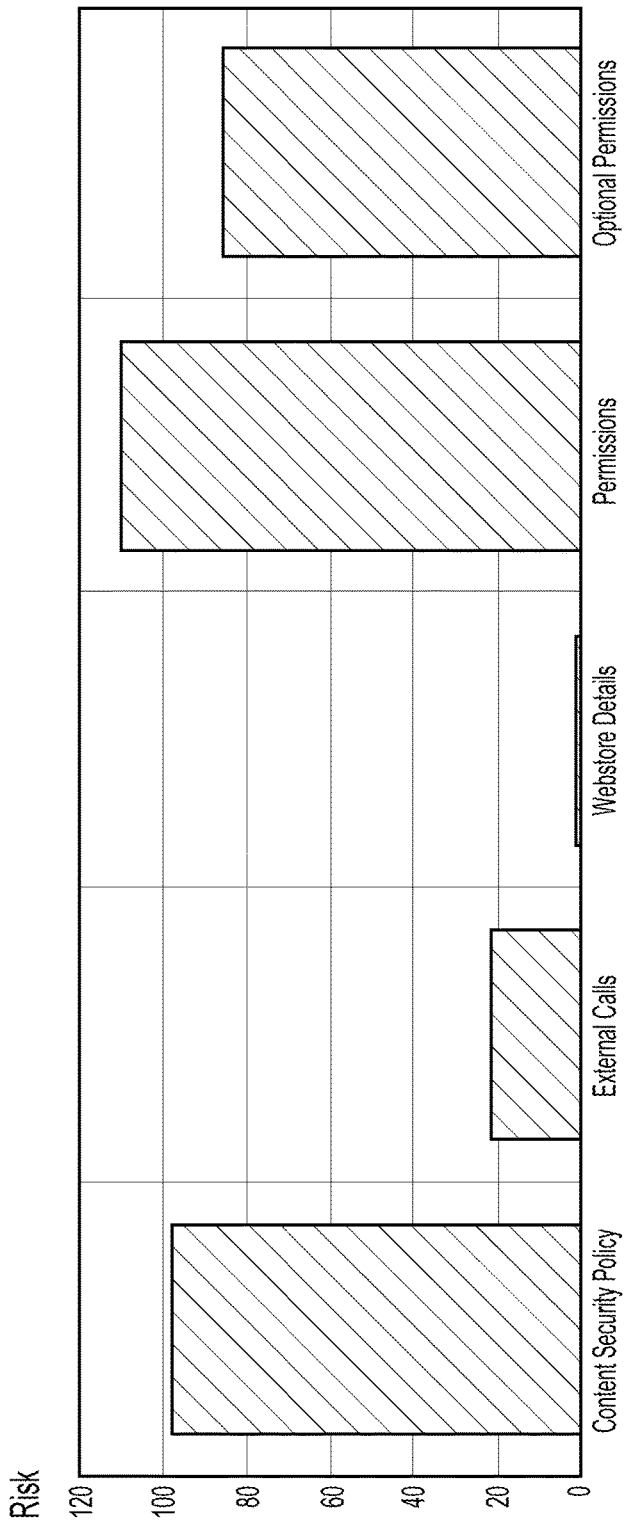
FIGS. 7A and 7B illustrate user interfaces that present risk score information associated with two different browser extensions using the process depicted in FIG. 6, according to an example embodiment.
Figure 7B:
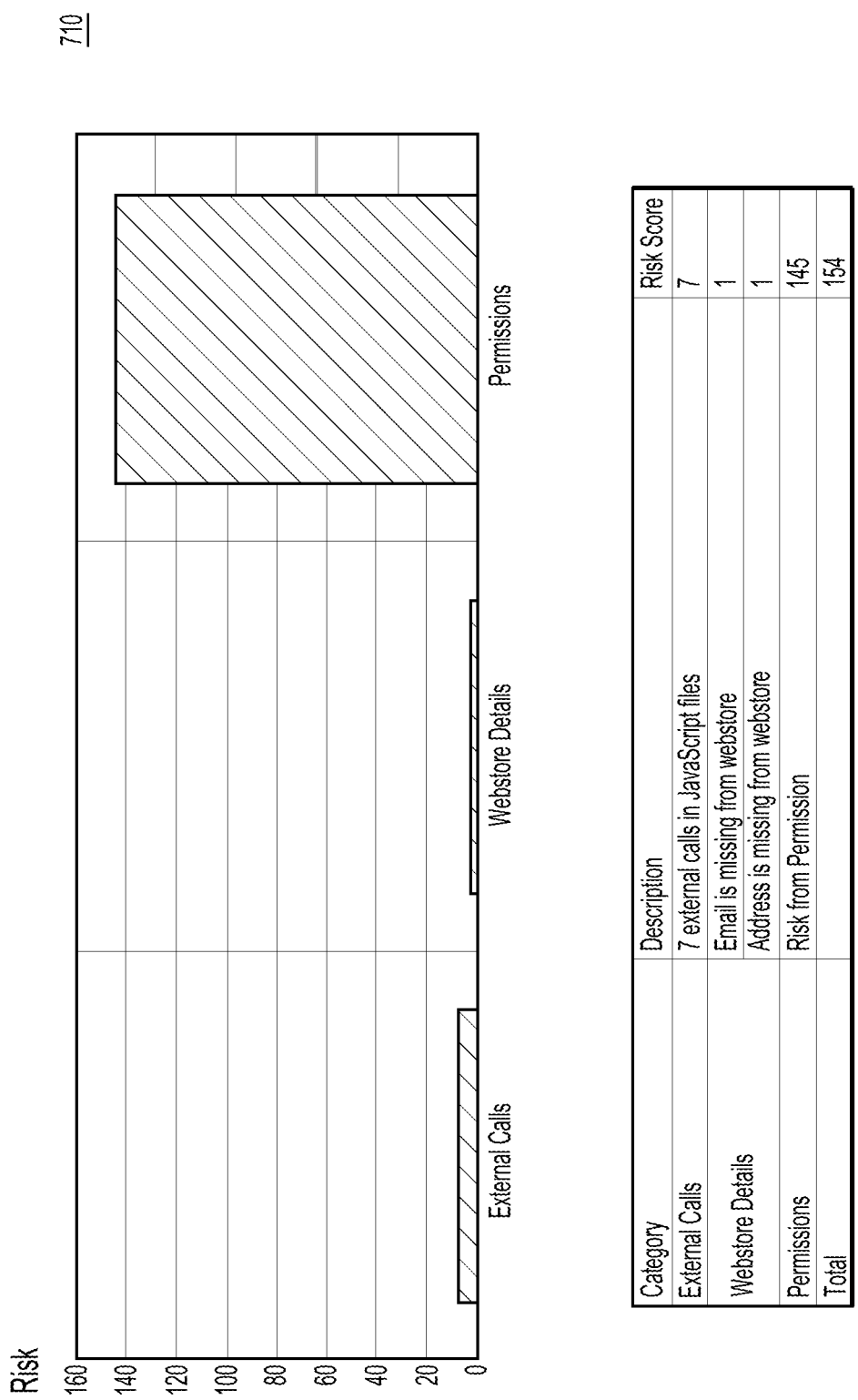

FIG. 7A illustrates a user interface 700 providing information for an example risk score of an extension and the tabulation of that risk score for individual risk components. FIG. 7B illustrates a user interface 710 providing information for an example risk score of another extension and the tabulation of that risk score for individual risk components In summary, as depicted in FIGS. 6, 7A and 7B, a method is provided by which a browser extension is scanned to determine its overall risk score, and that risk score is presented to the user in an easily digestible manner. This allows security conscious users and security operations analysts to determine if the extension is imposing an acceptable amount of risk to their user base.

When maintaining a browser extension whitelist, it is useful to know when an updated version of an extension becomes available in a browser extension store so that the new version can be re-reviewed and potentially removed from the whitelist if the new version is deemed too risky.

Figure 8:
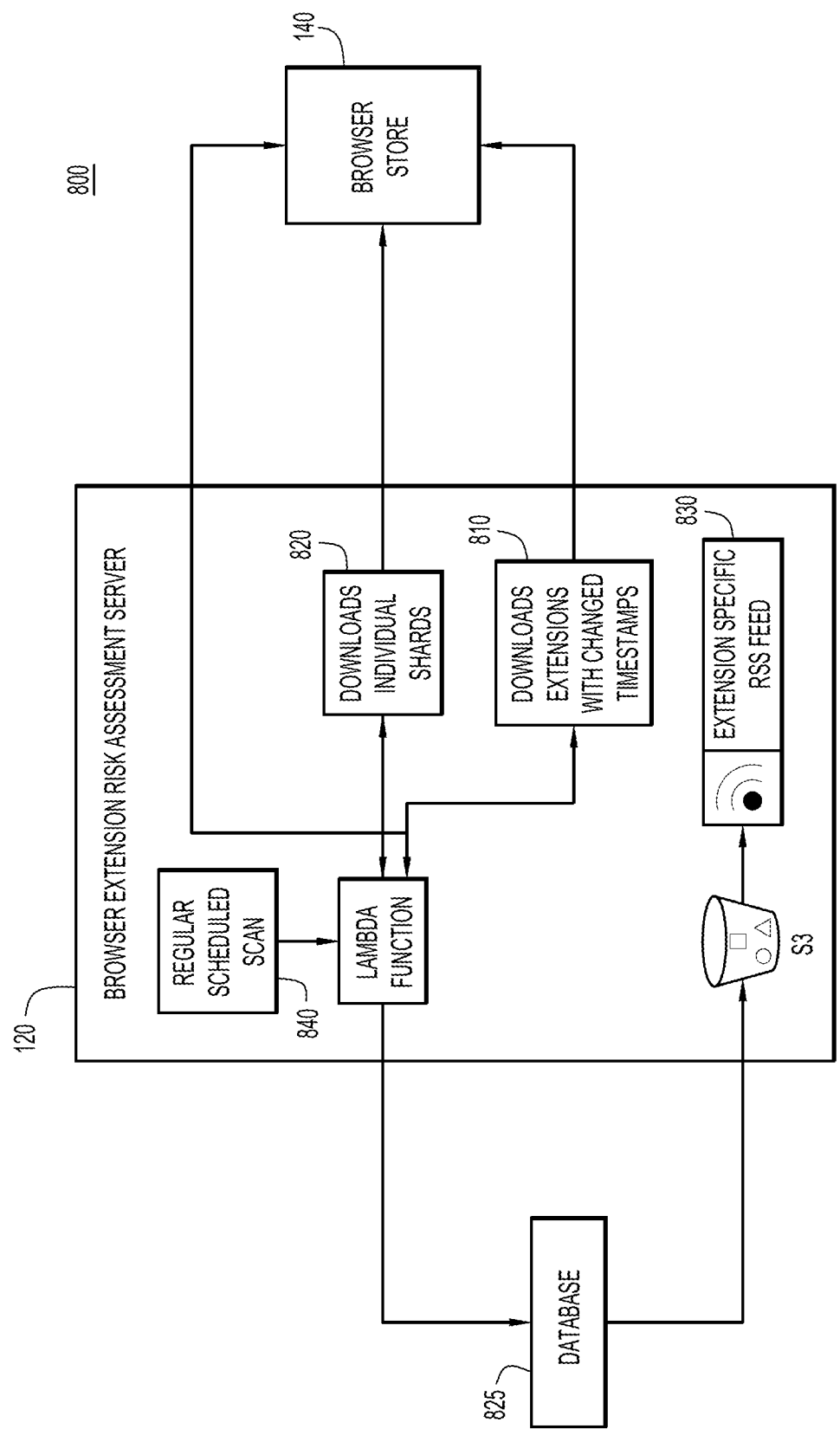
FIG. 8 illustrates a process to continuously scan a browser store for updates to browser extensions, according to an example embodiment.

Reference is now made to FIG. 8, which shows a process 800 performed by the browser extension risk assessment server 120 to scan for risk changes due to updates to browser extensions. The browser extension risk assessment server 120 may continuously monitor extensions in order to determine when a browser extension receives an update. The browser extension risk assessment server 120 continuously scans the browser store 140 for new updates and publishes a Rich Site Summary (RSS) feed from which information can be shared regarding updates to extensions.

The browser extension risk assessment server 120 detects updates to browser extensions by reading the sitemap of the browser store 140, and recording the timestamps for each shard of the sitemap as shown at 810. At 820, the browser extension risk assessment server 120 then triggers serverless code execution (e.g., via an AWS Lambda function) for each shard to download the shard and record every identified extension ID as well as the "last changed" timestamp associated with each extension.

If the "last changed" timestamp for an extension is different than what has been previously recorded in a database 825, the browser extension risk assessment server 120 will re-download and analyze the extension. Once analysis is complete, an RSS feed for the extension is updated with the new version of the extension and a link to the scan report. At 830, these RSS feeds can then be subscribed to by interested parties allowing them to get prompt notifications about new updates.

Additionally, in order to support the continuous scanning of unlisted extensions (e.g., extensions that are accessible with a link but do not appear in a web-based search or a browser store's sitemap), the browser extension risk assessment server 120 may perform a secondary continuous scan process. On a regularly-scheduled basis (e.g., every three hours), at 840, the browser extension risk assessment server 120 will read a list of all extension IDs in its database. These extension IDs are then put in a queue that invokes an AWS Lambda function that will provide to an API for the browser store in order to obtain the current version of the extension and compare it to the current version that the browser extension risk assessment server 120 has scanned.

In addition to the RSS feeds that the browser extension risk assessment server 120 publishes, the browser extension risk assessment server 120 also makes available for download every version of every extension it has ever scanned.

This allows an administrator to be able to install the old version of the extension for testing purposes and validate themselves what is in the report.

In summary, the browser extension risk assessment server 120 scans the entire browser continuously and publishes an RSS feed for every extension. This allows users to subscribe to it and be notified of updates to new extensions, which was previously not possible.

Figure 9:
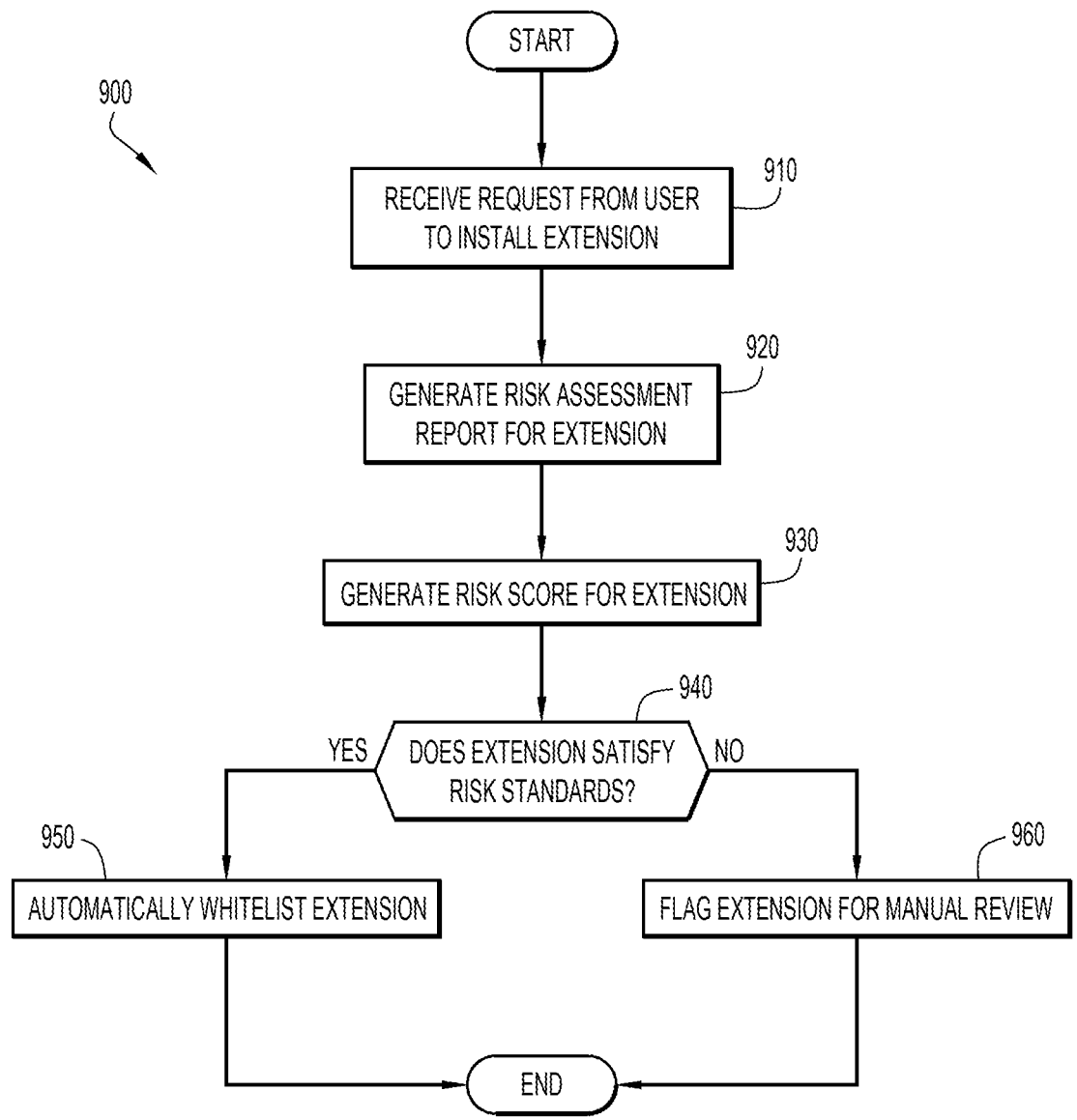
FIG. 9 is a flow chart depicting a method for automatically performing a risk assessment for a browser extension, according to an example embodiment.

FIG. 9 is a flow chart depicting a method 900 for automatically performing a risk assessment for a browser extension, according to an example embodiment. Reference is also made to FIG. 1 for purposes of the description of FIG. 9.

A request is received from a user to install an extension at operation 910. This request for review of the extension may include a business justification for the extension, and may be transmitted by the gatherer extension 164 to the browser extension risk assessment server 120. When a user of a device, such as user device 160(1), navigates to a browser extension store page, the gatherer extension 164 may detect that the user has visited the page and may obtain the corresponding extension ID. In some embodiments, the gatherer extension 164 obtains the extension ID from the address bar of the web browser 162. The gatherer extension 164 may transmit the extension ID to the browser extension risk assessment server 120, which consults the whitelist 121 to determine whether the extension is included and is therefore approved for installation.

If the extension is included in the whitelist, then the extension may be installed on the web browser 162 of the user device; however, if the extension is not whitelisted, then the gatherer extension 164 may prompt the user to indicate whether the user would like to install the extension, and if so, may prompt the user to provide a business justification for the extension to be added to the whitelist. Once the request and business justification for the request are collected, the information may transmitted to the browser extension risk assessment server 120.

A risk assessment report is generated for the extension at operation 920. The risk assessment report may include an analysis of the risks associated with an extension. The risk assessment report may be generated by accessing, e.g., via an API, browser extension data from the browser extension store. The browser extension risk assessment server 120 may generate the risk assessment report by analyzing information obtained from the browser extension data, including manifest information, permission information, content security policy, and extension metadata. In some embodiments, the information obtained from the browser extension data is analyzed to determine whether the browser extension includes any vulnerabilities in third-party libraries (such as JavaScript libraries), any dangerous functions (e.g., functions deemed dangerous to the web browser 162, operating system and/or other software of web browser 162, or other devices in the enterprise network), and/or any dangerous entry points.

A risk score is generated for the extension at operation 930. The risk score may be generated by summing the individual values associated with the permission, content security policy information, extension metadata, identified risks, and the like, that have been identified as associated with the extension. Thus, the risk score may be a value that represents the overall risk associated with an extension.

Operation 940 determines whether the extension satisfies the risk standards of the organization. The browser extension risk assessment server 120 may compare the risk score to a predetermined threshold to determine whether the browser extension exceeds a permissible threshold of risk for an organization. If the extension's score does not exceed the threshold, then the extension is automatically whitelisted at operation 950. In some embodiments, when an extension is whitelisted, browser extension risk assessment server 120 may transmit instructions to the device of the user to install the browser extension. If the extension's score does not exceed the threshold, the extension is flagged for manual review at operation 960. Extensions flagged for manual review may be reviewed by a network administrator, who may then add the extension to the whitelist, or may exclude the extension from the whitelist.

FIG. 10 illustrates a hardware block diagram of a computing device 1000 that may perform the functions of any of the browser extension risk assessment server 120 (and user devices), referred to herein in connection with FIGS. 1-10. It should be appreciated that FIG. 10 provides only an illustration of one embodiment and does not imply any limitations with regard to the environments in which different embodiments may be implemented. Many modifications to the depicted environment may be made.

As depicted, the device 1000 includes a bus 1012, which provides communications between computer processor(s) 1014, memory 1016, persistent storage 1018, communications unit 1020, and input/output (I/O) interface(s) 1022. Bus 1012 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1016 and persistent storage 1018 are computer readable storage media. In the depicted embodiment, memory 1016 includes random access memory (RAM) 1024 and cache memory 1026. In general, memory 1016 can include any suitable volatile or non-volatile computer readable storage media. Instructions for the browser extension risk assessment logic 1017 may be stored in memory 1016 or memory 1018 for execution by processor(s) 1014.

One or more programs may be stored in persistent storage 1018 for execution by one or more of the respective computer processors 1014 via one or more memories of memory 1016. The persistent storage 1018 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices. In these examples, communications unit 1020 includes one or more network interface cards. Communications unit 1020 may provide communications through the use of either or both physical and wireless communications links.

I/O interface(s) 1022 allows for input and output of data with other devices that may be connected to computer device 1000. For example, I/O interface 1022 may provide a connection to external devices 1028 such as a keyboard, keypad, a touch screen, and/or some other suitable input device. External devices 1028 can also include portable computer readable storage media such as database systems, thumb drives, portable optical or magnetic disks, and memory cards.

Software and data used to practice embodiments can be stored on such portable computer readable storage media and can be loaded onto persistent storage 1018 via interface(s) 1022. I/O interface(s) 1022 may also connect to a display 1030. Display 1030 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python™, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a computer-implemented method is provided comprising: obtaining, from a user device of a plurality of user devices associated with an organization, a request to install a browser extension for a browser of the user device, wherein the request comprises an extension identifier and a business justification for the browser extension; generating, for the browser extension, a risk score that is based on risk values for each of one or more permissions requested by the browser extension; determining whether the browser extension satisfies risk standards of the organization by comparing the risk score to a threshold value for the organization; and in response to determining that the browser extension satisfies the risk standards, automatically adding the browser extension to a whitelist of permitted extensions for approved installation on the plurality of user devices. A risk assessment report may be generated by accessing, via an application programming interface, information pertaining to the browser extension from a browser extension store; and analyzing the information to generate the risk assessment report. The information may include one or more of manifest information, permission information, content security policy, and extension metadata. In response to automatically whitelisting the browser extension, an instruction may be transmitted to the user device to install the browser extension. The browser may include a gatherer extension that obtains the extension identifier from the browser. The request may include a business justification for installation of the browser extension.

The operation of analyzing the information may include determining whether the browser extension includes one or more of: a vulnerability in a third-party library, a dangerous function, and a dangerous entry point.

In one form, the computer-implemented method may further include determining that an updated version of the browser extension is available; generating, for the updated version of the browser extension, an updated risk score that is based on risk values for each of one or more permissions requested by the updated version of the browser extension; determining whether the updated version of the browser extension satisfies risk standards of the organization by comparing the updated risk score to a threshold value for the organization; and in response to determining that the browser extension does not satisfy the risk standards, removing the browser extension from the whitelist.

In another form, an apparatus is provided comprising: a communication interface configured to enable network communications; one or more computer processors; one or more computer readable storage media; program instructions stored on the one or more computer readable storage media for execution by at least one of the one or more computer processors, that when executed by the one or more computer processors, cause the one or more computer processors to: obtain, from a user device of a plurality of user devices associated with an organization, a request to install a browser extension for a browser of the user device, wherein the request comprises an extension identifier and a business justification for the browser extension; generate, for the browser extension, a risk score that is based on risk values for each of one or more permissions requested by the browser extension; determine whether the browser extension satisfies risk standards of the organization by comparing the risk score to a threshold value for the organization; and in response to determining that the browser extension satisfies the risk standards, automatically add the browser extension to a whitelist of permitted extensions for approved installation on the plurality of user devices.

In another form, one or more non-transitory computer readable storage media are provided that are encoded with instructions that, when executed by one or more processors, cause the one or more processors to: obtain, from a user device of a plurality of user devices associated with an organization, a request to install a browser extension for a browser of the user device, wherein the request comprises an extension identifier and a business justification for the browser extension; generate, for the browser extension, a risk score that is based on risk values for each of one or more permissions requested by the browser extension; determine whether the browser extension satisfies risk standards of the organization by comparing the risk score to a threshold value for the organization; and in response to determining that the browser extension satisfies the risk standards, automatically add the browser extension to a whitelist of permitted extensions for approved installation on the plurality of user devices.

In summary, the techniques presented herein solve the problem of determining whether to whitelist a browser extension in response to a request from a user. This approach automates the process of reviewing browser extensions to determine whether an extension may be included in an organization's whitelist of approved extensions. These techniques employ a special-purpose browser extension, called a gatherer extension, that is configured to gather information about browser extensions installed in a browser, a specialized process to generate a risk score associated with browser extensions, and a process to continuously scan a browser store to determine when updates are released to browser extensions.

These techniques provide security to a network without requiring manual intervention by an administrator, which can be time-consuming and costly. Moreover, these techniques provide feedback to network administrators regarding the requested extensions, enabling administrators to obtain a better understanding of the risks imposed by extensions in the event that manual whitelisting decisions are necessary.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, from a user device of a plurality of user devices associated with an organization, a first request to install a browser extension for a browser of the user device, wherein the first request comprises an extension identifier and a business justification for the browser extension;
    in response to obtaining the first request to install the browser extension, generating, for the browser extension, a risk score that is based on risk values for each of one or more permissions requested in a second request by the browser extension, wherein each permission provides access to particular data of the browser;
    determining whether the browser extension satisfies risk standards of the organization by comparing the risk score to a threshold value for the organization; and
    in response to determining that the browser extension satisfies the risk standards, automatically adding the browser extension to a whitelist of permitted extensions for approved installation on the plurality of user devices.

2. The computer-implemented method of claim 1, further comprising generating a risk assessment report by:
   accessing, via an application programming interface, information pertaining to the browser extension from a browser extension store; and
   analyzing the information to generate the risk assessment report.

3. The computer-implemented method of claim 2, wherein the information comprises one or more of: manifest information, permission information, content security policy, and extension metadata.

4. The computer-implemented method of claim 2, wherein analyzing the information comprises determining whether the browser extension includes one or more of: a vulnerability in a third-party library, a dangerous function, and a dangerous entry point.

5. The computer-implemented method of claim 1, further comprising:
   in response to automatically whitelisting the browser extension, transmitting an instruction to the user device to install the browser extension.

6. The computer-implemented method of claim 1, wherein the browser includes a gatherer extension, and wherein the gatherer extension obtains the extension identifier from the browser.

7. The computer-implemented method of claim 1, further comprising:
   determining that an updated version of the browser extension is available;
   generating, for the updated version of the browser extension, an updated risk score that is based on risk values for each of one or more permissions requested by the updated version of the browser extension;
   determining whether the updated version of the browser extension satisfies risk standards of the organization by comparing the updated risk score to a threshold value for the organization; and
   in response to determining that the browser extension does not satisfy the risk standards, removing the browser extension from the whitelist.

8. The computer-implemented method of claim 1, wherein a user of the user device is prompted to provide the business justification for installation of the browser extension.

9. An apparatus comprising:
   a communication interface configured to enable network communications;
   one or more computer processors;
   one or more computer readable storage media; and
   program instructions stored on the one or more computer readable storage media for execution by at least one of the one or more computer processors, that when executed by the one or more computer processors, cause the one or more computer processors to:
   obtain, from a user device of a plurality of user devices associated with an organization, a first request to install a browser extension for a browser of the user device, wherein the first request comprises an extension identifier and a business justification for the browser extension;
   in response to obtaining the first request to install the browser extension, generate, for the browser extension, a risk score that is based on risk values for each of one or more permissions requested in a second request by the browser extension, wherein each permission provides access to particular data of the browser;
   determine whether the browser extension satisfies risk standards of the organization by comparing the risk score to a threshold value for the organization; and
   in response to determining that the browser extension satisfies the risk standards, automatically add the browser extension to a whitelist of permitted extensions for approved installation on the plurality of user devices.

10. The apparatus of claim 9, wherein the program instructions to generate a risk assessment report further cause the one or more processors to:
   access, via an application programming interface, information pertaining to the browser extension from a browser extension store; and
   analyze the information to generate the risk assessment report.

11. The apparatus of claim 10, wherein the information comprises one or more of:
   manifest information, permission information, content security policy, and extension metadata.

12. The apparatus of claim 10, wherein the program instructions to analyze the information comprise instructions to determine whether the browser extension includes one or more of: a vulnerability in a third-party library, a dangerous function, and a dangerous entry point.

13. The apparatus of claim 9, wherein the program instructions further comprise instructions to cause the one or more processors to:
   in response to automatically whitelisting the browser extension, transmit an instruction to the user device to install the browser extension.

14. The apparatus of claim 9, wherein the browser includes a gatherer extension, and wherein the gatherer extension obtains the extension identifier from the browser.

15. The apparatus of claim 9, wherein the program instructions further comprise instructions to cause the one or more processors to:
   determine that an updated version of the browser extension is available;
   generate, for the updated version of the browser extension, an updated risk score that is based on risk values for each of one or more permissions requested by the updated version of the browser extension;
   determine whether the updated version of the browser extension satisfies risk standards of the organization by comparing the updated risk score to a threshold value for the organization; and
   in response to determining that the browser extension does not satisfy the risk standards, remove the browser extension from the whitelist.

16. One or more non-transitory computer readable storage media encoded with program instructions that, when executed by one or more processors, cause the one or more processors to:
   obtain, from a user device of a plurality of user devices associated with an organization, a first request to install a browser extension for a browser of the user device, wherein the first request comprises an extension identifier and a business justification for the browser extension;
   in response to obtaining the first request to install the browser extension, generate, for the browser extension, a risk score that is based on risk values for each of one or more permissions requested in a second request by the browser extension, wherein t each permission provides access to particular data of the browser;

determine whether the browser extension satisfies risk standards of the organization by comparing the risk score to a threshold value for the organization; and in response to determining that the browser extension satisfies the risk standards, automatically add the browser extension to a whitelist of permitted extensions for approved installation on the plurality of user devices.

17. The one or more non-transitory computer readable storage media of claim 16, wherein the program instructions to generate a risk assessment report further cause the one or more processors to:

access, via an application programming interface, information pertaining to the browser extension from a browser extension store; and analyze the information to generate the risk assessment report.

18. The one or more non-transitory computer readable storage media of claim 17, wherein the information comprises one or more of: manifest information, permission information, content security policy, and extension metadata.

19. The one or more non-transitory computer readable storage media of claim 17, wherein the program instructions to analyze the information comprise instructions to determine whether the browser extension includes one or more of: a vulnerability in a third-party library, a dangerous function, and a dangerous entry point.

20. The one or more non-transitory computer readable storage media of claim 17, wherein the program instructions further comprise instructions to cause the one or more processors to:

determine that an updated version of the browser extension is available;

generate, for the updated version of the browser extension, an updated risk score that is based on risk values for each of one or more permissions requested by the updated version of the browser extension;

determine whether the updated version of the browser extension satisfies risk standards of the organization by comparing the updated risk score to a threshold value for the organization; and in response to determining that the browser extension does not satisfy the risk standards, remove the browser extension from the whitelist.

\* \* \* \* \*